March 15, 1938.　　　　G. WHEAT　　　　2,111,347
STORAGE BATTERY
Filed June 11, 1932
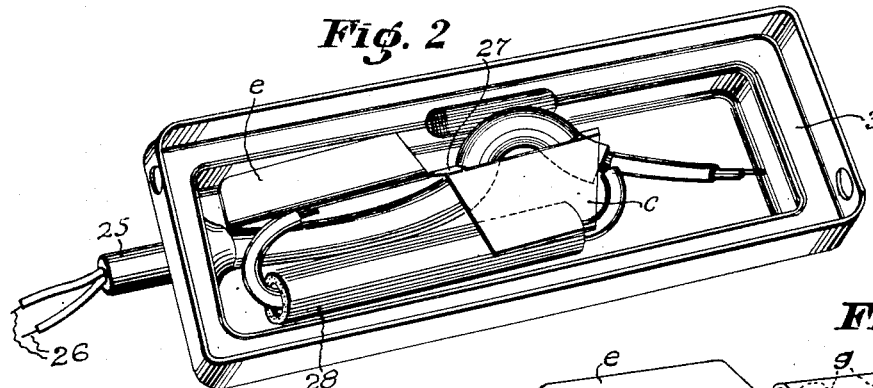
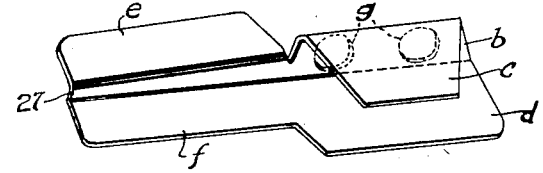
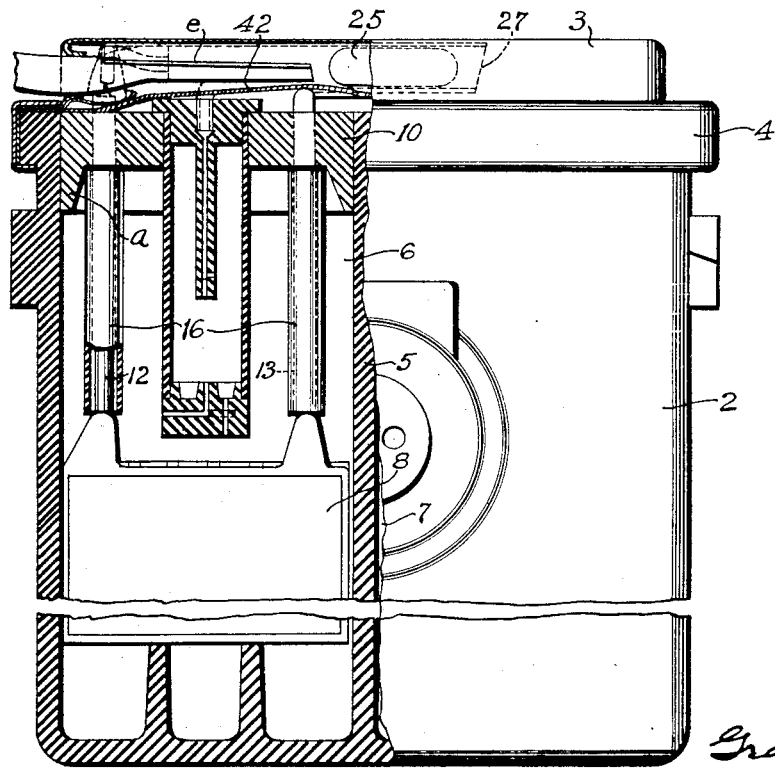

Patented Mar. 15, 1938

2,111,347

UNITED STATES PATENT OFFICE 2,111,347

STORAGE BATTERY

Grant Wheat, Marlboro, Mass., assignor to Koehler Manufacturing Company, Marlboro, Mass., a corporation of Massachusetts Application June 11, 1932, Serial No. 616,668

3 Claims. (Cl. 173—322)

This invention relates to storage batteries and is more especially, but not exclusively, concerned with that type of storage battery designed for use with portable electric lamps, such as miner's lamps and those used by mechanics, inspectors, and others.

In storage batteries of this general type there is frequent occasion to handle the battery solely by the cord which connects it to the lamp or other article supplied with current by it. This naturally subjects the connections between the battery leads and the conductors in the cord as well as the lower end portions of these conductors to very rough usage, and the present invention aims to devise a construction capable of successfully withstanding such usage.

The nature of the invention will be readily understood from the following description when read in connection with the accompanying drawing, and the novel features will be particularly pointed out in the appended claims.

In the drawing,

Figure 1 is a side view, partly in vertical section and partly broken away, of a battery embodying features of this invention;

Fig. 2 is a perspective view of the battery top and illustrates an anchoring device which forms a feature of this invention; and Fig. 3 is a perspective view of the cable anchoring plate shown in Fig. 2.

Referring first to Fig. 1, the battery structure there shown comprises a casing which includes a jar 2 made of hard rubber, vulcanite, "Bakelite", or some other material of an equivalent nature, and a sheet metal casing top or cover 3. The top 3 is secured to the jar 2 by means of a sheet metal girdle 4, preferably made in two sections which are secured together by screws. So far as these features are concerned the battery is similar to those disclosed in certain of my prior patents.

The particular battery shown includes two cells, and for this purpose the jar 2 is divided by a partition 5 into two chambers 6 and 7. Independent sets of battery plates are mounted in the two chambers, the set for the chamber 6 being shown at 8. The upper end of each chamber preferably is closed by soft rubber gaskets, one of which is shown at 10, this gasket fitting snugly into the top of the chamber and having a downwardly extending flange or skirt $a$, which, when the battery is inverted, is pressed firmly against the walls of the chamber by the hydraulic pressure exerted by the electrolyte. Lead wires 12 and 13 extend from the positive and negative plates, respectively, in the chamber 6 and project through holes in the gasket 10 to a suitable height above this gasket to permit the making of proper electrical connections. Similar lead wires are provided for the other cell, and all of these lead wires are enclosed in rigid tubes 16 made of hard rubber, "Bakelite", or some other non-metallic and acid-proof material, which serves to space the plates from the gasket.

When this battery is used in a miner's lamp, or in any other lamp mounted in a casing which is separate from the battery, it is customary to connect the lamp casing with the battery casing by means of a cable or heavy cord 25 containing wires 26 for operatively connecting the battery elements with the lamp. In order to avoid placing undue strain on the connections between the conductors 26 and the leading-in wires for the battery, the cord 25 is run through an anchoring plate 27, Figs. 2 and 3, which will take any pull or similar strain applied to the cord. This plate may conveniently be made of aluminum, or some other light weight metal, and it preferably includes a channel section comprising a central flange $b$ and two parallel flanges $c$ and $d$ extending from opposite edges of the flange $b$ and approximately parallel to each other. In the particular construction shown the central flange or web $b$ runs the entire length of the device, and at one end of the channel section the device is provided with approximately parallel flanges $e$ and $f$ which extend in opposite directions to each other and cooperate with the other flanges and the battery parts in holding the plate flatwise in the casing with the channel section properly spaced from the end of the casing. The middle web $b$ in the channel section has two apertures or holes $g$ formed therethrough and the cord 25 is threaded through these holes, as shown in Fig. 2, so that this part of the plate holds the cord in a looped condition.

When the device is properly placed in the cover 3 one of the wires extends toward one end of the cover, while the other is bent backwardly between the flanges $c$ and $d$ and usually is encircled by a rubber sleeve 28, sometimes containing a fuse. The left-hand end, Fig. 2, of the anchoring device rests against the corresponding end of the cover 3. The entire anchoring plate with the cord disposed in it, as shown in Fig. 2, occupies relatively little vertical space so that it lies flat in the top of the cover. At the same time any pull on the cable 25 is taken up by the looped portion of the cord since it is very difficult to slide this rubber covered cable through the holes in the anchor plate simply by a direct pull. The compact arrangement of the conductor and the anchoring plate is of advantage in reducing the vertical dimensions of the cover 3. It should also be observed that the greater part of the flange e overlies one of the gaskets 10 while the flange c lies chiefly over the opposite gasket, so that said plate and cable back up the gaskets, both flanges avoiding any substantial interference either with the electrical connections or with the vent tubes. A sheet 42 of rubber preferably is interposed between the anchor plate and the parts at the top of the cells.

The arrangement above described affords a secure anchorage for the cord 25 and prevents the transmission of any pull or strain on the cord to the connections between the conductors 26 and the lead wires, such as those shown at 12 and 13. Thus the reliability of the apparatus is improved and the danger of failure in service is greatly reduced.

Having thus described my invention, what I desire to claim as new is:—

1. In a storage battery, the combination with a battery casing member having an aperture therethrough and a cord containing a conductor to be electrically connected with said battery, said cord extending through said aperture, of a cord anchoring plate in said casing member having two flanges, and a third flange extending at an abrupt angle to both the others, one of said flanges having a plurality of holes through which said cord extends and which serve to hold the cord in a looped form, whereby said plate serves to anchor said cord in said casing, the other flanges serving to protect the cord and cooperating with said casing member to hold the plate in its operative position.

2. In a storage battery, the combination with a battery casing member having an aperture therethrough and a cord containing a conductor to be electrically connected with said battery, said cord extending through said aperture, of a cord anchoring plate in said casing, said plate having a channel-shaped section provided with holes in the central flange of said section through which holes said cord is threaded and by means of which the cord is held in a looped form, the other flanges cooperating with said central flange to protect the cord and with adjacent parts of the battery structure to hold said plate in its operative position.

3. In a storage battery, the combination with a battery casing member having an aperture therethrough and a cord containing a conductor to be electrically connected with said battery, said cord extending through said aperture, of a cord anchoring plate in said casing, said plate having a central flange provided with holes through which said cord is threaded and by means of which it is held in a looped form, additional approximately parallel flanges extending from said apertured section and adapted to receive said cord between them, and additional flange members extending in opposite directions to each other from an adjacent part of said central flange and cooperating with parts of the battery structure to hold said plate in its operative position.

GRANT WHEAT.